(12) United States Patent
Bjorklund

(10) Patent No.: US 6,766,095 B1
(45) Date of Patent: Jul. 20, 2004

(54) APPARATUS AND METHOD FOR SLACK MANAGEMENT OF FIBER OPTIC CABLES

(75) Inventor: Brian Bjorklund, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/245,501

(22) Filed: Sep. 18, 2002

(51) Int. Cl.[7] .......................... G02B 6/00; H01R 11/00; H01R 33/945

(52) U.S. Cl. ...................... 385/135; 385/137; 439/502; 439/577

(58) Field of Search ................................ 385/135, 137, 385/24, 31, 39; 439/502, 577

(56) References Cited

U.S. PATENT DOCUMENTS

| | | | |
|---|---|---|---|
| 5,625,737 A | * | 4/1997 | Saito .......................... 385/137 |
| RE36,592 E | * | 2/2000 | Giebel et al. ................ 385/100 |
| RE37,028 E | * | 1/2001 | Cooke et al. ................ 385/112 |
| 6,464,404 B1 | * | 10/2002 | Robinson et al. ............. 385/54 |
| 6,522,804 B1 | * | 2/2003 | Mahony ...................... 385/24 |
| 6,572,081 B2 | * | 6/2003 | Griffioen et al. ......... 254/134.4 |

OTHER PUBLICATIONS

Marconi Communications, www.marconi.com.

* cited by examiner

*Primary Examiner*—Chandrika Prasad
(74) *Attorney, Agent, or Firm*—Shaw Pittman LLP (57) ABSTRACT

A device, system, and method for managing slack in fiber optic cables that are connected from a fiber distribution shelf to a fiber termination shelf in a controlled environment vault are described. Individual fiber optic cables are bundled together and placed in a sheath. The ends of the individual fiber optic cables extend past the sheath and are staggered to correspond to ports in the fiber distribution shelf.

16 Claims, 13 Drawing Sheets

FIG. 3
KNOWN ART

FIG. 4
*PRIOR ART*

FIG. 5
KNOWN ART

FIG. 6A
*PRIOR ART*

*FIG. 6B*
*KNOWN ART*

FIG. 7
KNOWN ART

MX CARD END

| Fiber Number | Leg Length (in) | Fiber Number | Leg Length (in) |
|---|---|---|---|
| 1 | 11.25 +2.25/-0 | 15 | 25.25 +2.25/-0 |
| 2 | 9.25 +2.25/-0 | 16 | 23.25 +2.25/-0 |
| 3 | 13.25 +2.25/-0 | 17 | 27.25 +2.25/-0 |
| 4 | 11.25 +2.25/-0 | 18 | 25.25 +2.25/-0 |
| 5 | 15.25 +2.25/-0 | 19 | 29.25 +2.25/-0 |
| 6 | 13.25 +2.25/-0 | 20 | 27.25 +2.25/-0 |
| 7 | 17.25 +2.25/-0 | 21 | 31.25 +2.25/-0 |
| 8 | 15.25 +2.25/-0 | 22 | 29.25 +2.25/-0 |
| 9 | 19.25 +2.25/-0 | 23 | 33.25 +2.25/-0 |
| 10 | 17.25 +2.25/-0 | 24 | 31.25 +2.25/-0 |
| 11 | 21.25 +2.25/-0 | 25 | 35.25 +2.25/-0 |
| 12 | 19.25 +2.25/-0 | 26 | 33.25 +2.25/-0 |
| 13 | 23.25 +2.25/-0 | 27 | 37.25 +2.25/-0 |
| 14 | 21.25 +2.25/-0 | 28 | 35.25 +2.25/-0 |

All leg lengths are as measured from the epoxy plug

FIBER BAY END

| Fiber Number | Leg Length (in) |
|---|---|
| 1-28 | 21 +2.25/-0 |

APPARATUS AND METHOD FOR SLACK MANAGEMENT OF FIBER OPTIC CABLES

BACKGROUND

1. Field of the Invention

The present invention relates generally to an arrangement of fiber optic cables that are utilized for transmitting signals in a telecommunications network. More particularly, the present invention relates to reducing the slack and routing complexity that normally result when equipment is coupled using the cables.

2. Background of the Invention

Currently, signals transmitted from a central office to a subscriber in a telecommunications network undergo several transformations. The signals are transmitted from the central office as optical signals that travel along fiber optic cables. The optical signals are received at a CEV ("controlled environment vault") where they are converted to electrical signals that are transmitted over copper wires and then are converted back to optical signals before being transmitted to the subscriber.

Figure 1:
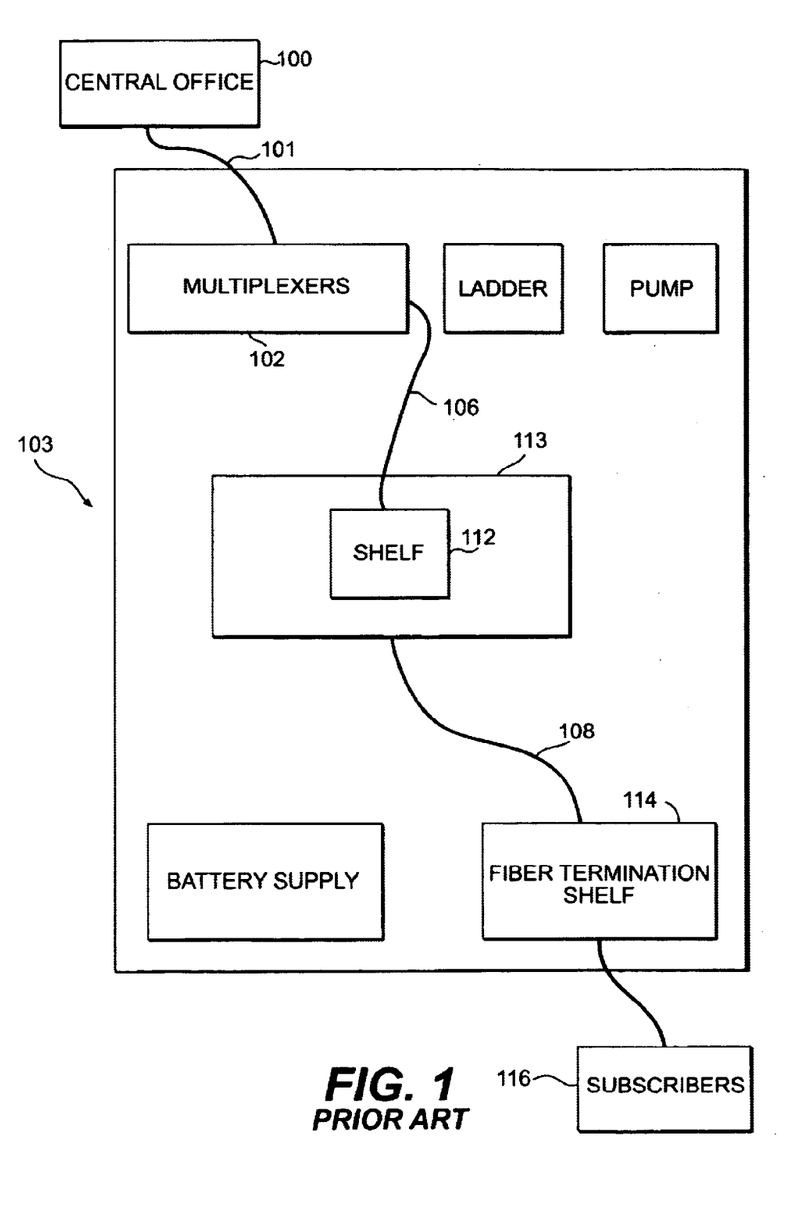
FIG. 1 is a schematic diagram of the interconnection of a conventional CEV in a telecommunications network.

FIG. 1 is a schematic diagram of a conventional CEV 103 within a telecommunications system. CEVs house electronic equipment that converts the signals and are typically located about ten (10) to twelve (12) feet deep underground. The signals are temporarily converted to electrical signals for the purpose of amplifying or otherwise adjusting them. Typically, fiber optic cables 101 enter the CEV from a central office 100 and connect to multiplexers 102. Multiplexers 102 convert the optical signals into electrical signals. Jumper cables 106 are wired from multiplexers 102 to an equipment bay assembly shelf 112, within an equipment bay assembly 113, which provides electrical signal cross-connects and separates the respective signals into a dial tone. Fiber optic cables 108 connect the equipment bay assembly shelf 112 to a fiber termination shelf 114. The fiber termination shelf 114 is a cross-connect, and ultimately connects the fiber optic cables to subscribers 116. A ladder, pump, and battery supply (not enumerated in FIG. 1) are also contained in the CEV.

Figure 2:
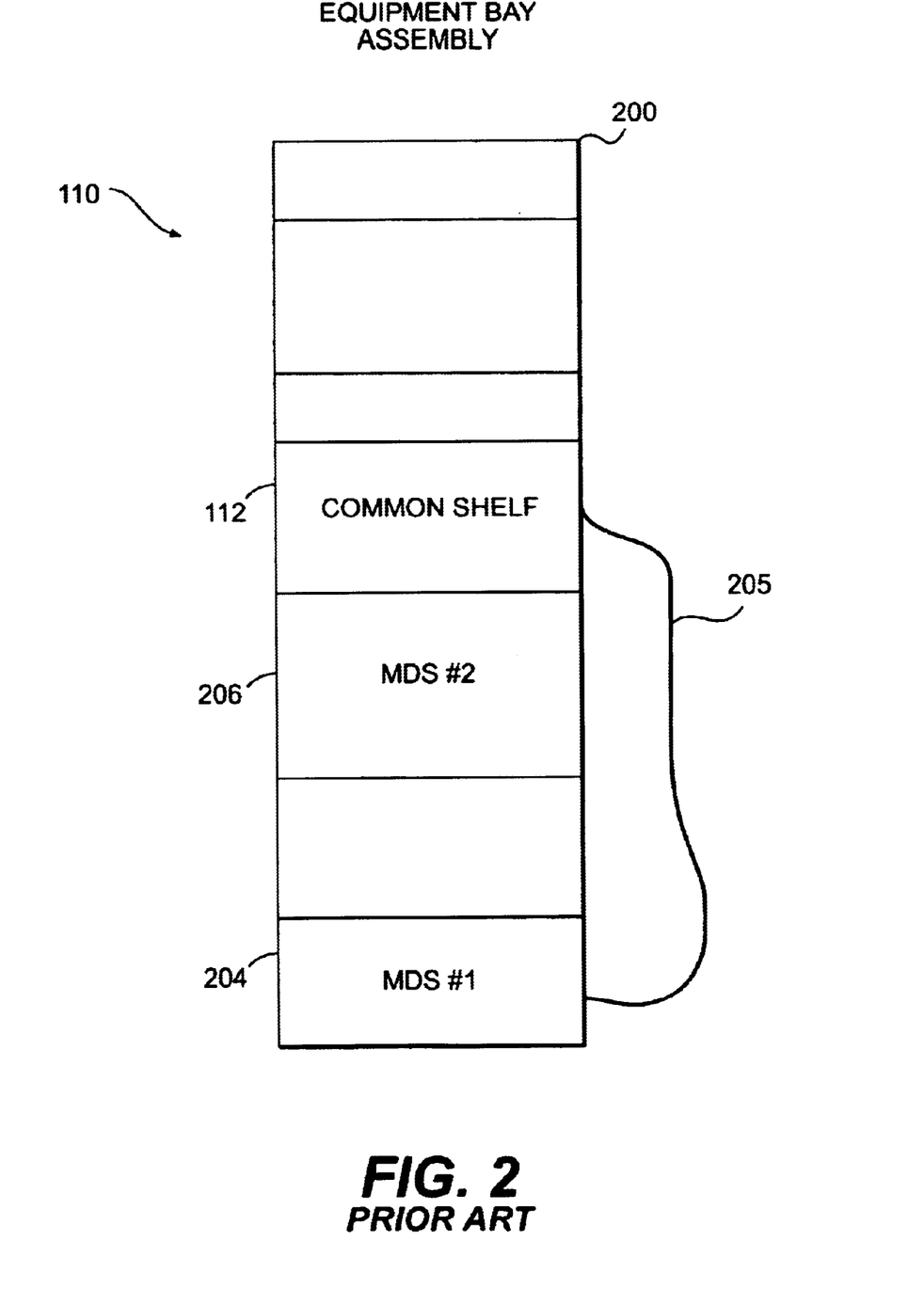
FIG. 2 is a schematic diagram of an exemplary equipment bay assembly.

FIG. 2 is a schematic diagram illustrating a typical configuration of an equipment bay assembly 113. An example of an equipment bay assembly system is the DISC*S MX Bay Assembly manufactured by Marconi Corporation PLC. Fiber optic cables 205 are coupled to a fiber distribution shelf, MDS #1 204, from common shelf 112. There are twenty-eight (28) T-1 lines coupled to the common shelf 112, carrying twenty-four (24) telephone lines between the common shelf and MDS #1. Although not shown in the present embodiment, fiber optic cables may also be connected to MDS #2 206.

Figure 3:
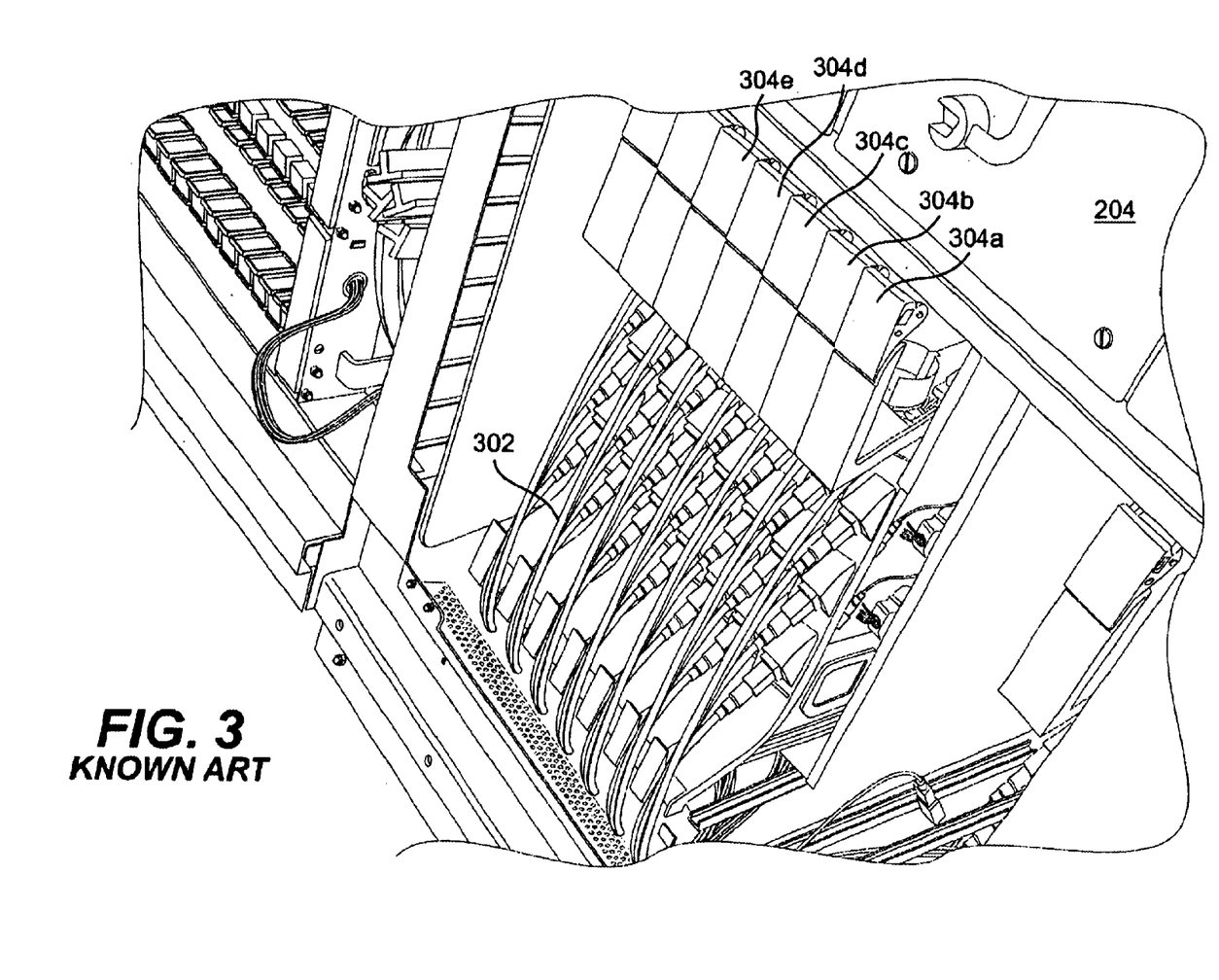
FIG. 3 depicts a conventional fiber distribution shelf in an exemplary equipment bay assembly as in FIG. 2.

FIG. 3 is a depiction of a fiber distribution shelf 204 illustrating how fiber optic cables 205 are attached. Fiber distribution shelf 204 has fourteen (14) removable cards (not all shown) 304a–304n each having four (4) fiber ports. Cards 304 fit into slots (not shown) in a housing of fiber distribution shelf 204. The fiber ports are color-coded and numbered according to a well-known universal color code. (according to this color code, blue is "1", orange is "2", green is "3" and brown is "4"). Fiber cables 205 are quad jumper cables, such that each cable consists of four (4) separate cables that are grouped together. Therefore for each card, the cable has four (4) ends, one of each color, grouped together to form a single cable.

Figure 4:
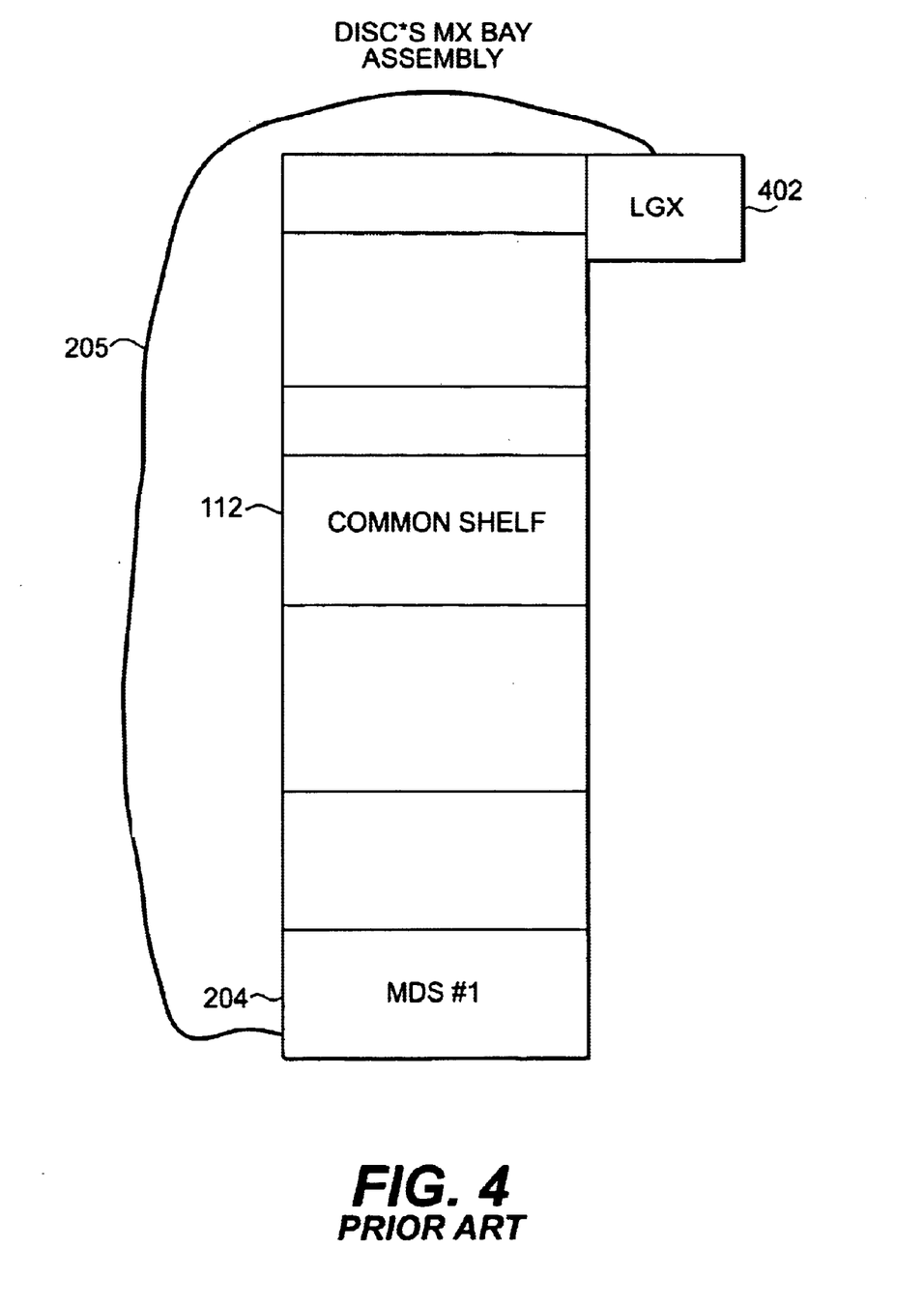
FIG. 4 is a schematic diagram of the equipment bay assembly in FIG. 2, illustrating a connection of fiber optic cables.

As shown in FIG. 4, each of the 14 fiber optic cables 205 are then connected from one of the cards in the fiber distribution shelf 204 to fiber termination shelf LGX 402. From fiber termination shelf 402, signals are ultimately transmitted to a neighborhood to supply service to respective subscribers.

Figure 5:
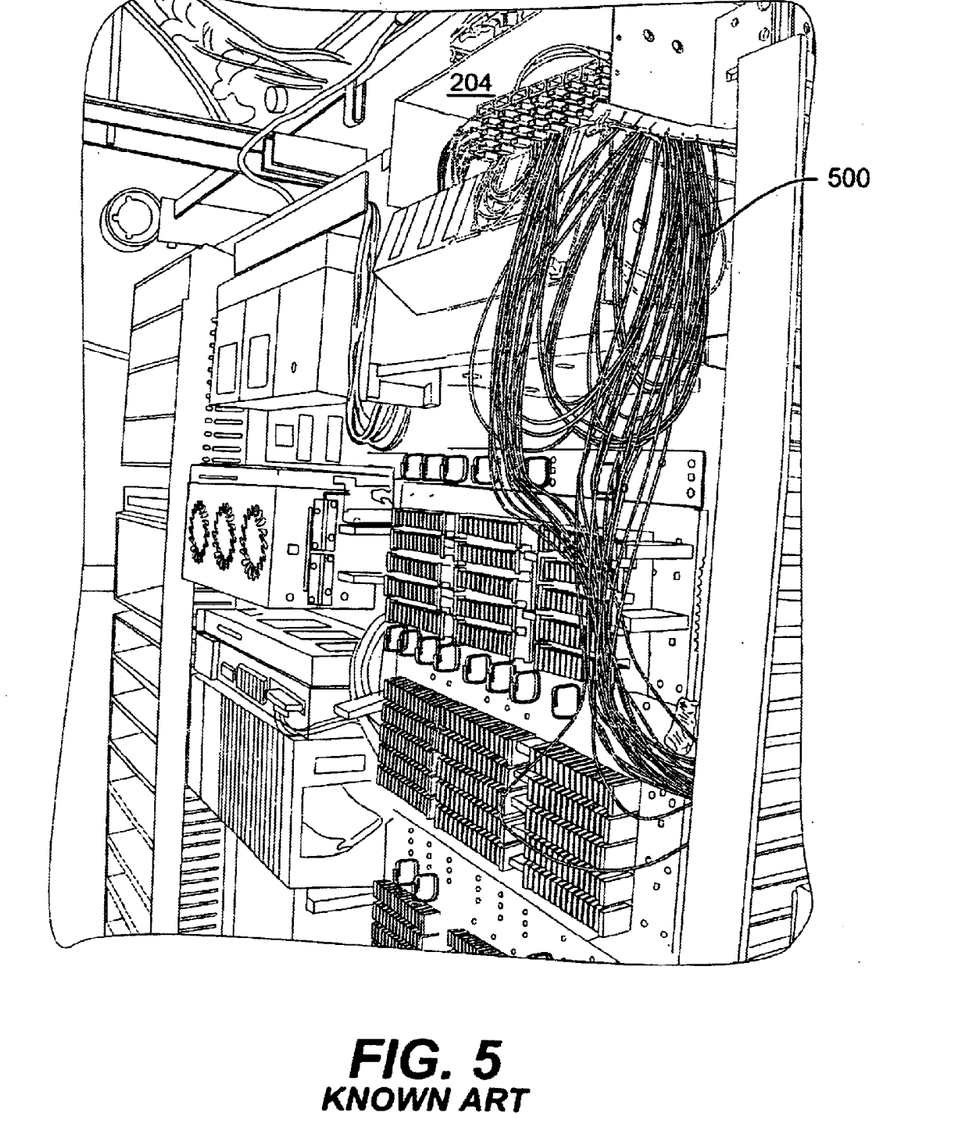
FIG. 5 depicts an exemplary equipment bay assembly connected to a fiber termination shelf utilizing a conventional arrangement of fiber optic cables.

The conventional configuration of fiber optic cables within a CEV as described above is associated with several difficulties and inefficiencies. Particularly, while each card 304 can accommodate 4 fiber optic cables, each handling 24 telephone lines for a total of 1344 lines in fiber distribution shelf 204, common shelf 112 can only accommodate 28 T-1 cables, or 672 telephone lines. As a result, only two (2) of the four (4) available ports in each card are used. Although equipment bay assemblies, such as future releases of the MX system may use a second fiber distribution shelf (MDS # 2, shown as 206 in FIG. 2), it cannot concurrently be used to connect to the fiber termination shelf 402. As shown in FIG. 5, the unused cables are instead loosely hanging by the equipment bay assembly. Since all of the cables are the same length, there is slack 500, which sometimes causes damage to the cables.

Figure 6A:
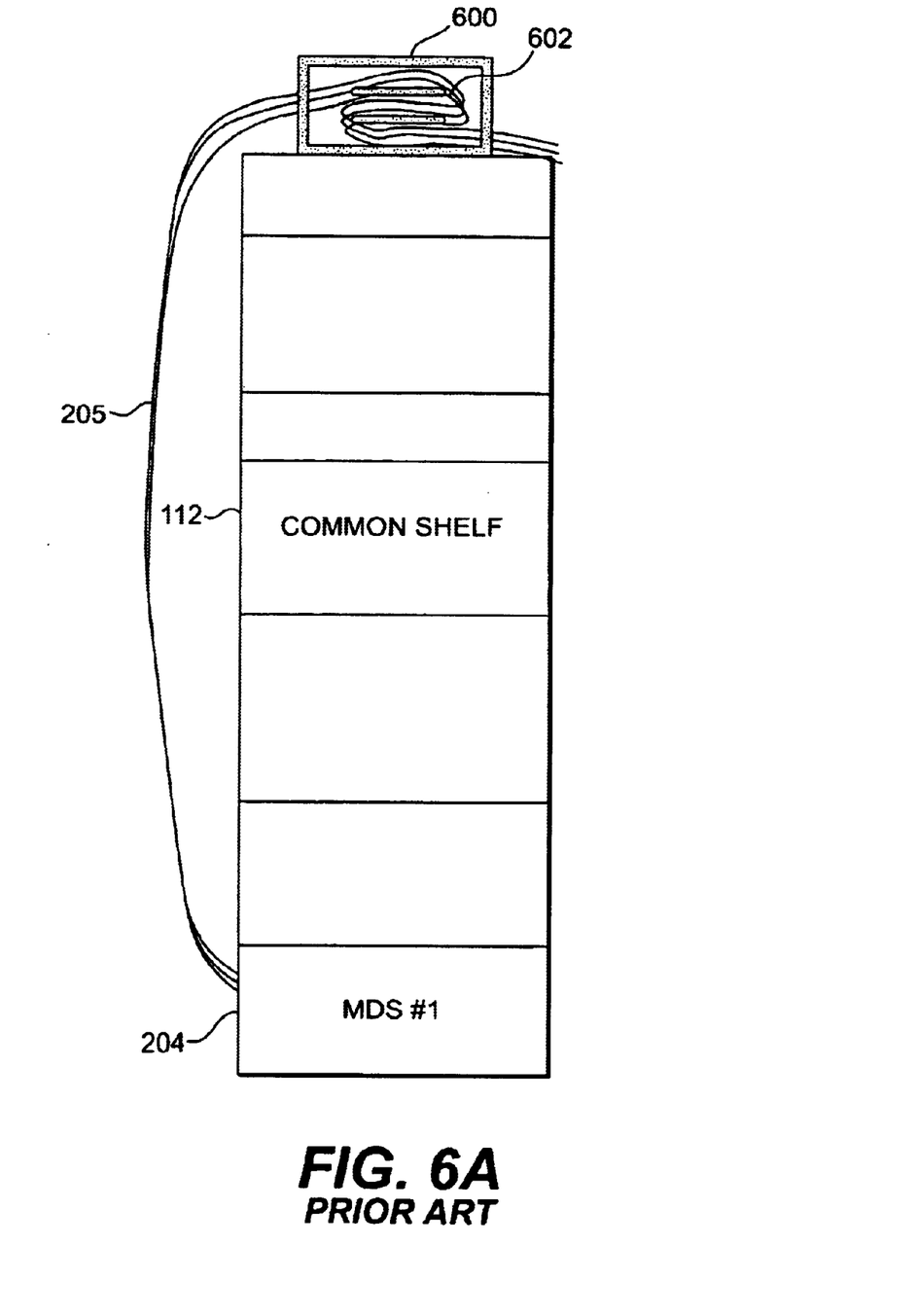
FIG. 6a is a schematic diagram of a conventional apparatus for handling slack of a fiber optic cables in a CEV.
Figure 6B:
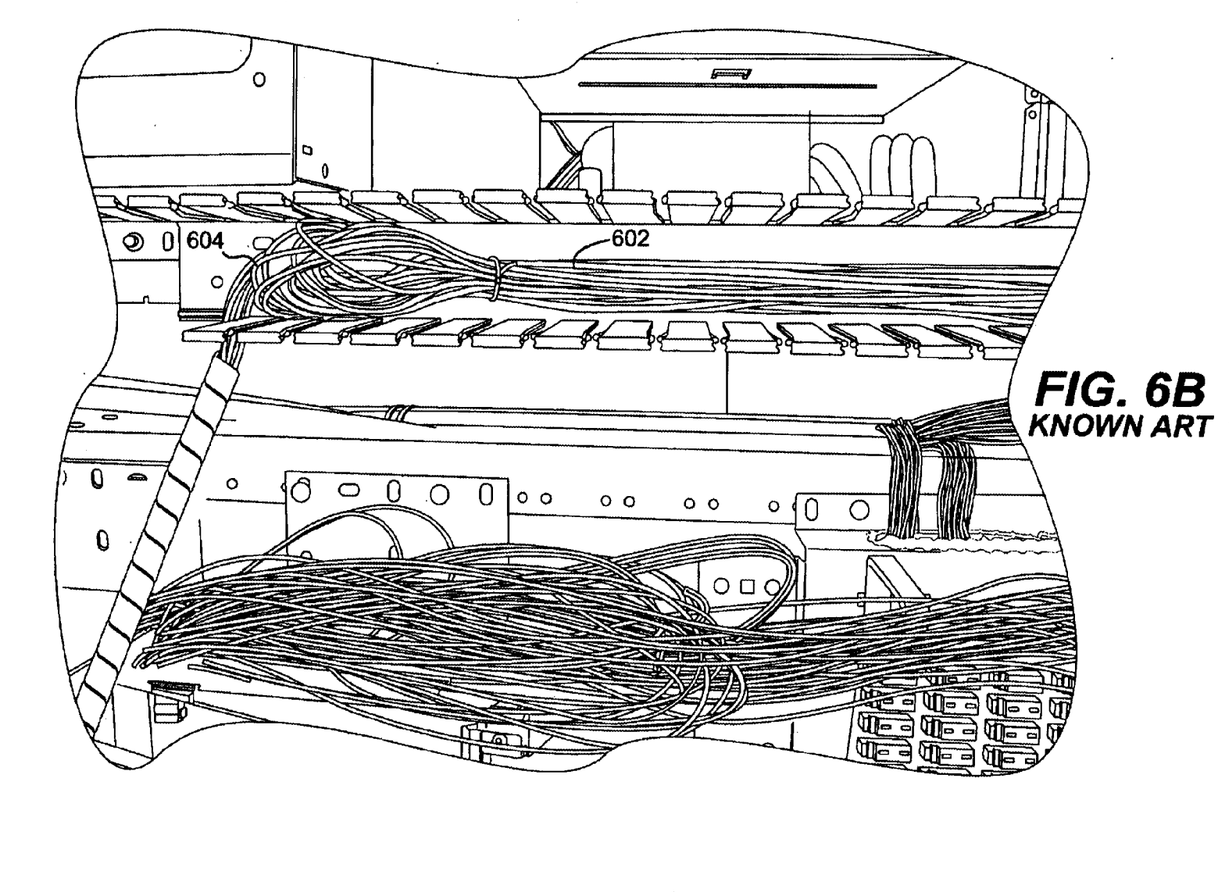
FIG. 6b depicts another conventional arrangement for handling slack in a CEV.

FIGS. 6a and 6b illustrate conventional means for handling slack in fiber optic cables 602 that couple the fiber distribution shelf 204 to the fiber termination shelf 402. As shown in FIG. 6a, a fiber management device 600 is placed on top of equipment bay assembly 113, and excess cable 602 is contained within the device 600. However, device 600 is expensive, and it also is not specifically tailored to particular equipment bay assemblies. Depending on the length of the excess cable, it may be difficult to install the device 600.

FIG. 6b depicts an arrangement of cables connecting the fiber distribution shelf to the fiber termination shelf that are looped in order to reduce the amount of excess cable that is hanging loosely. As shown, the excess cable 602 is simply looped and placed aside. Because the space in which the cables are looped is narrow, the looping can cause sharp bends 604. Such sharp bends may damage or break fiber optic cables, or otherwise affect the transmission characteristics of the cables, necessitating their replacement.

Figure 7:
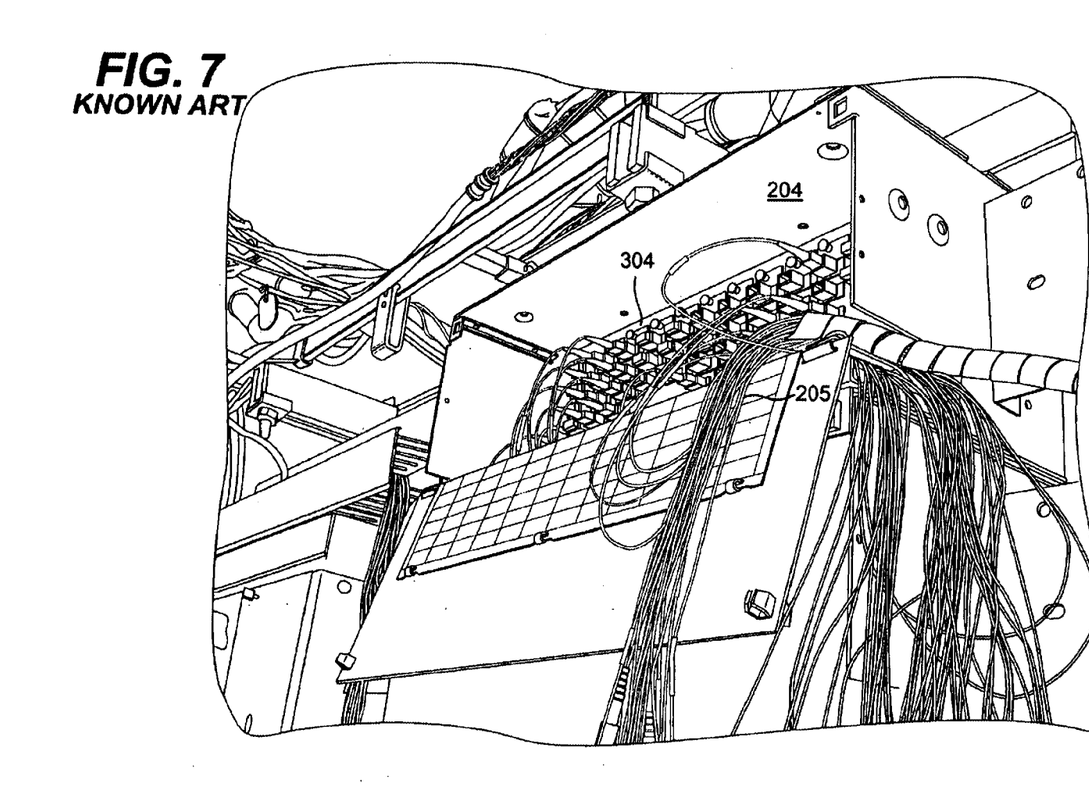
FIG. 7 depicts conventional connections of the fiber optic cables to a fiber distribution shelf.

FIG. 7 illustrates a conventional connection of quad jumpers 205 to fiber distribution shelf 204. Because the ends of the cables are all the same length and there is a separate cable for each group of four (4) jacks on each card, it is difficult to efficiently wire the ends of the cables into the ports in the cards 304 of the fiber distribution shelf 204 to reduce slack. Moreover, there are no indicator labels on the cable ends to assist one installing the cables. In addition, there is a separate cable for each group of four (4) jacks on each card.

As can be seen, conventional cable wiring or routing paradigms lead to a mass of cables for which slack is not efficiently removed. As a result, cables frequently obstruct passage in the close confines of the CEVs or are susceptible to damage or breakage.

SUMMARY OF THE INVENTION

The present invention solves at least the foregoing problems in the art by providing a cost-effective device, system, and method for managing slack in fiber optic cables. The slack management technique of the present invention is more cost effective and provides more protection for the cable than in conventional systems.

In the present invention, individual fiber optic cables are bundled together and placed in a sheath. The ends of the individual fiber optic cables extend past the sheath and are staggered on one end to correspond to ports on a shelf on an equipment bay assembly while on the other end, the cables are the same length to accommodate a variety of fiber termination shelves.

BRIEF DESCRIPTION OF THE DRAWINGS

FIG. 8b is chart of the measurements for an exemplary embodiment according to FIG. 8a.

FIG. 9 depicts connections of the fiber optic cables to a fiber distribution shelf utilizing an apparatus for bundling cables according to FIG. 8a.

FIG. 10 depicts a method to manage slack in an apparatus for bundling cables according to FIG. 8a.

DETAILED DESCRIPTION OF THE INVENTION

Figure 8A:
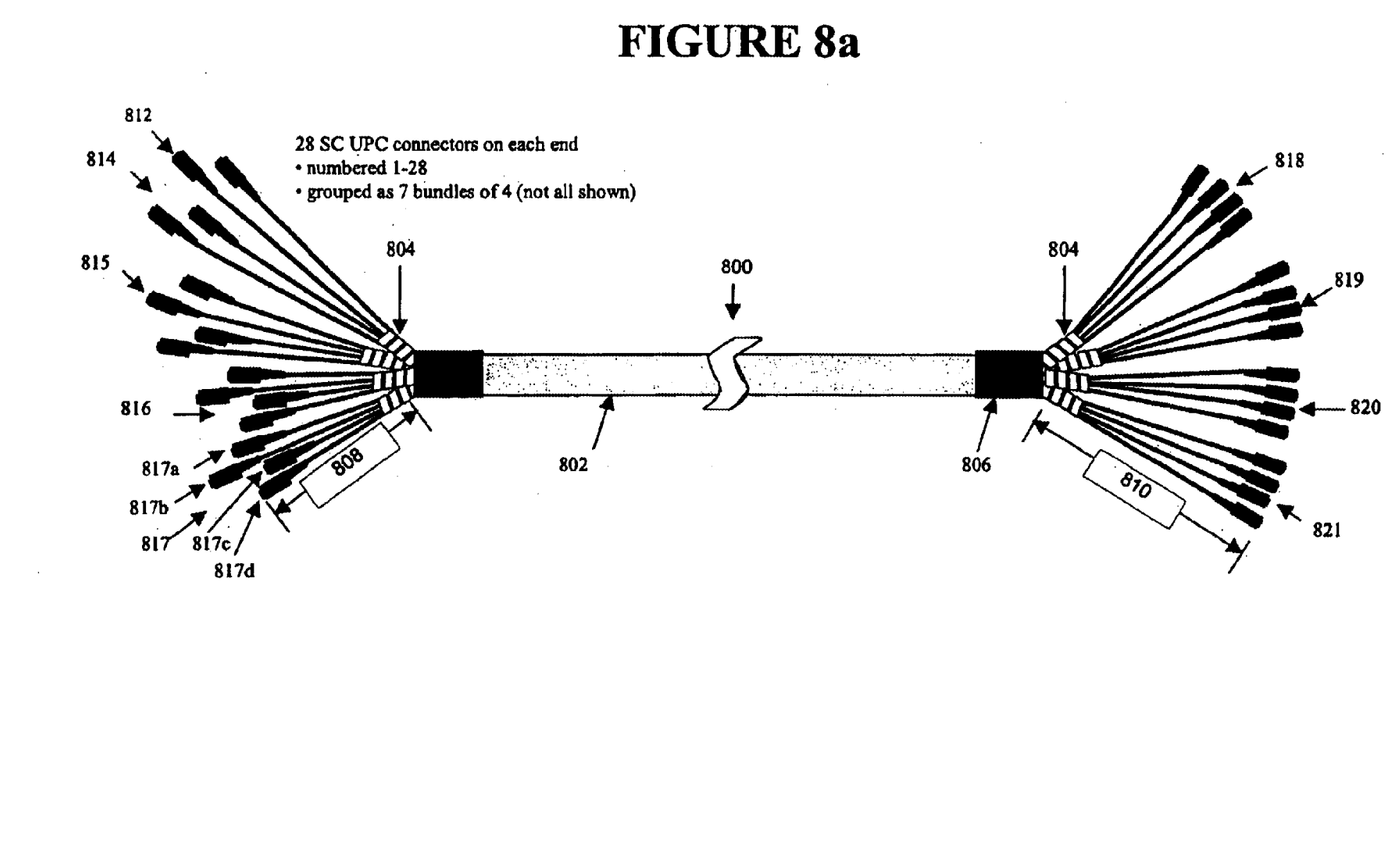
FIG. 8a is a schematic diagram of an apparatus for bundling cables according to an embodiment of the present invention.

FIG. 8a depicts a cable assembly that can be used to connect a fiber distribution shelf to a fiber termination shelf with reduced slack and increased protection for fiber optic cables, according to an embodiment of the present invention. The fiber optic cables run from the central office, ultimately to telecommunications subscribers, through a CEV, as shown in FIG. 1.

In the embodiment illustrated in FIG. 8a, cable assembly 800 includes twenty-eight ("28") fiber optic cables bundled together in groups of four. Depending on how many fiber jumpers the common shelf can handle, there will either be twenty-eight ("28") or fifty-six ("56") fiber optic cables coming into the CEV. If there are fifty-six ("56") fiber optic cables entering the common shelf, then there will be two cable assemblies 800 for connection to the fiber distribution shelf.

The cable assembly 800 includes a cable 802 which acts as a protective sheath. In an exemplary embodiment, the cable 802 can be a 12 foot length 36-fiber MIC riser cable having a 0.6 inch diameter. The cable assembly 800 connects the fiber distribution shelf to the fiber termination shelf in the CEV. Since the distance between the fiber distribution shelf and fiber termination shelf varies, cable 802 can be manufactured to be an appropriate length for the CEV in which the cable assembly will be used.

At either end of cable 802 is an epoxy plug 806, which bundles together the fibers. At both ends 808 and 810 of the epoxy plugs 806, the cable branches out into seven bundles (for clarity, only four bundles 814, 815, 816, and 817 are shown at end 808 and only four bundles 818, 819, 820, and 821 are shown at end 810), each having four cables (as shown by 817a–817d for bundle 817). The cables have connectors 812 on the ends.

On the end 808 that connects to the cards in the fiber distribution shelf, the cables 814–817 are staggered in length. The ports in fiber distribution shelf cards are engineered to be at a standard distance, and accordingly, the connectors 812 that are connected to the fiber distribution shelf can be staggered to match the configuration of the fiber distribution shelf. Although not shown in FIG. 8a, in the exemplary embodiment the cables 814–821 are numbered 1–28 and have connectors 812 on the ends to permit them to be wired into the fiber distribution shelf. Each bundle of four wires has spiral wrap 804 that extends, for example, six inches from the epoxy plug 806. The spiral wrap 804 maintains the bundles of four cables grouped together. Cables such as 817 plug into the left side of the fiber distribution shelf, and are therefore shorter than cables such as 814, that plug into the right side of the fiber distribution shelf. Thus, the cable lengths are staggered in length to be adaptively fitted to the respective connection on the fiber distribution shelf On the end that connects into the fiber termination shelf, the cables at end 810 (i.e. cables 818, 819, 820, and 821) are all the same length, since there are a variety of fiber termination shelves that may be used in a CEV, and the distance between the fiber distribution shelf and fiber termination shelf may differ. Therefore, cables at end 810 need to have a minimum amount of slack to allow for these differences. In the exemplary embodiment shown, the length of the cables at end 810 on the fiber termination shelf side is approximately equal to the average length of the cables 808 on the fiber distribution shelf side.

Figure 8B:
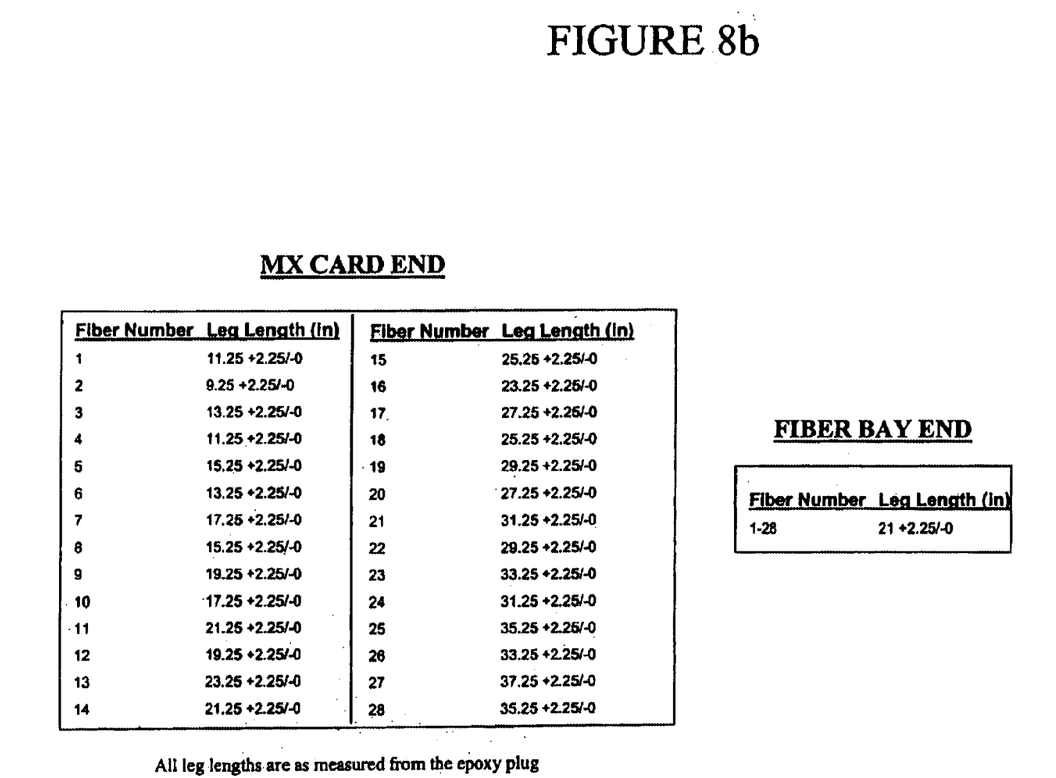

FIG. 8b is a chart illustrating the lengths of the cable ends in an exemplary embodiment. For each group of four cables on the MX card end, there are two cables that are the same length ("1" and "4", for example), one cable that is comparatively two inches shorter ("2", for example) and one cable that is comparatively two inches longer ("5", for example). As can be seen in the graph, the cables are progressively longer. The cables (all 28 of them) at the fiber termination shelf end are all the same length, for example, 21 inches. Although not shown in FIG. 8a, the cables can be numbered to facilitate installation.

Figure 9:
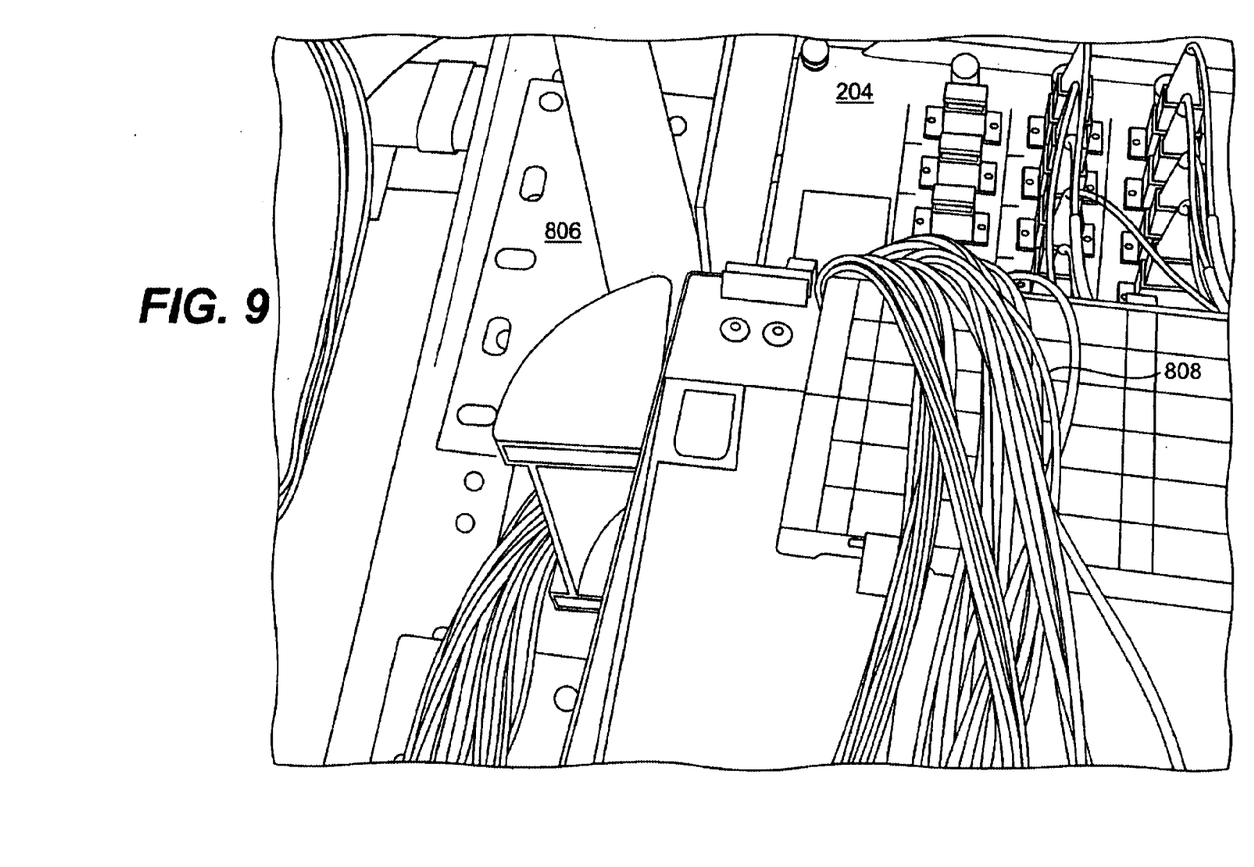

FIG. 9 illustrates that the staggered length cable end 808 creates less slack because the cables are exactly the length necessary to connect to the fiber distribution shelf 204. Also shown in FIG. 9 is how the epoxy plug 806 can be placed in a more discrete location to remove some of the excess cable.

Figure 10:
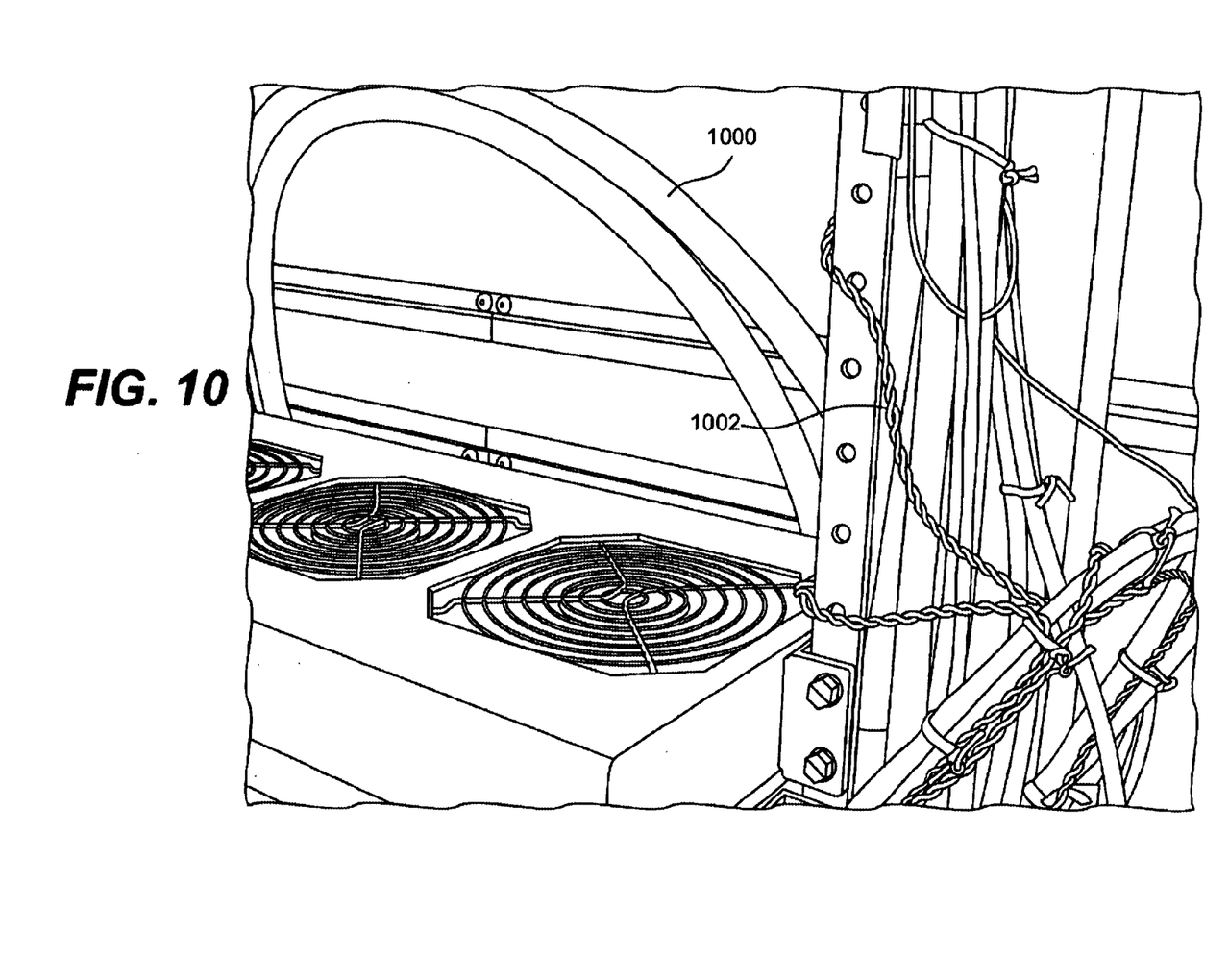

As shown in FIG. 10, on the fiber termination shelf side there will be a minimum amount of slack because the cables are not cut to the exact length necessary. However, the cable assembly of the present invention can be formed into a loop 1000 to be less intrusive. For example, the excess can be attached to the back of the bay assembly so that it is out of the way and a hook (not shown) can be used to secure the loop 1000. Once the cables are wired, the assembly can be tied down by using rope 1002. Typically, although the quad jumpers may need to be rearranged, the fiber distribution shelf and fiber termination shelf will not be moved, and so once the excess is placed out of the way, it may remain in this position.

Figure 11:
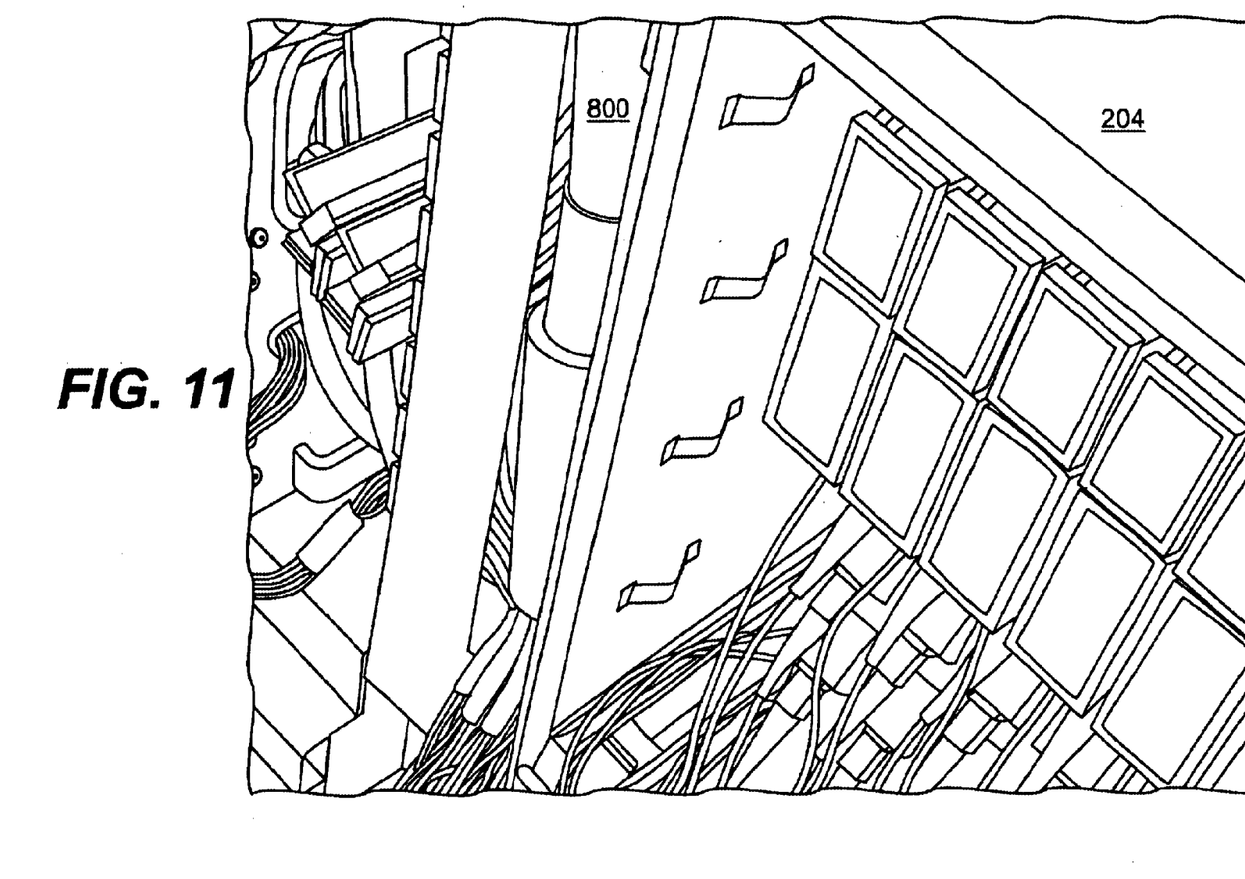
FIG. 11 depicts illustrating placement of an apparatus for bundling cables according to FIG. 8a in relation to the equipment bay assembly.

FIG. 11 depicts the new fiber management system 800 placed to the side of the bay assembly and the fiber distribution shelf 204, in a more convenient location. A comparison of FIG. 11 and FIG. 7, the conventional system, demonstrates the benefits of the new system.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A cable assembly for connecting lines between telecommunications equipment, comprising:
   a plurality of bundled groups of multiple individual fiber optic cables, at least one of the bundled groups of multiple individual fiber optic cables having a first end section of variable fiber optic cable length, a second end section of a predetermined fiber optic cable length and a middle portion; and
   a sheath for bundling together the middle portion of each of the plurality of bundled groups of multiple individual fiber optic cables, wherein the length of each first end section of each individual fiber optic cable is adapted to match the configuration of a corresponding connector in the telecommunications equipment being connected.

2. The cable assembly of claim 1, wherein the second end section of each of the individual fiber optic cables are of the same length.

3. The cable assembly of claim 1, wherein the individual fiber optic cables are numbered to correspond with connectors in the telecommunications equipment.

4. The cable assembly of claim 1, further comprising an epoxy plug located on each end of the cable.

5. The cable assembly of claim 1, further comprising connectors on both ends of each individual fiber optic cable.

6. The cable assembly of claim 1, wherein the individual fiber optic cables are further bundled together in groups of four for coordinating with the fiber distribution shelf.

7. The cable assembly of claim 1, further comprising spiral wrap placed around each bundled group of multiple individual fiber optic cables.

8. The cable assembly of claim 1, whereby when the ends of the individual fiber optic cables are connected to the fiber distribution shelf, there is a minimum amount of slack.

9. A system for managing slack in fiber optic cables connecting lines from a fiber distribution shelf to a fiber termination shelf, the system comprising:
   a plurality of bundled groups of individual fiber optic cables each having two ends, wherein one end of at least one of the plurality of bundled groups of individual fiber optic cables is varied in length;
   a protective sheath surrounding the fiber optic cables; and
   an equipment bay assembly having a fiber distribution shelf including a plurality of cards,
   wherein the ends of the fiber optic cables that vary in length connect to ports in the respective cards of the fiber distribution shelf, and the other end of the fiber optic cables connect to the fiber termination shelf.

10. The system of claim 9, wherein the fiber optic cables are configured to be a length sufficient to connect to the fiber distribution shelf while minimizing excess cable.

11. The system of claim 9, wherein the ends of the fiber optic cables that connect to the fiber termination shelf are the same length.

12. A method for managing slack in fiber optic cables, the method comprising:
   bundling together individual fiber optic cables into bundled groups of individual fiber optic cables, each cable having two ends;
   placing a sheath around the bundle of fiber optic cables;
   allowing for the ends of the individual fiber optic cables to extend past the sheath; and
   varying the length of one end of the individual fiber optic cables in at least one of the bundled groups of individual fiber optic cables.

13. The method of claim 12, wherein the ends of the individual fiber optic cables that vary in length are connected to a fiber distribution shelf.

14. The method of claim 13, wherein the fiber distribution shelf includes cards, and the fiber optic cables connect to ports on the respective cards of the fiber distribution shelf.

15. The method of claim 14, wherein the ends that vary in length are configured to a length than allows the fiber optic cables to connect to the ports without any excess cable.

16. The method of claim 15, wherein the numbers correspond to the port that the end is connected to.

* * * * *